M. STONE.
DRIVING BELT.
APPLICATION FILED AUG. 21, 1916.
1,220,795.
Patented Mar. 27, 1917.
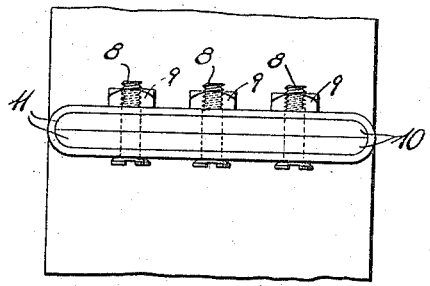
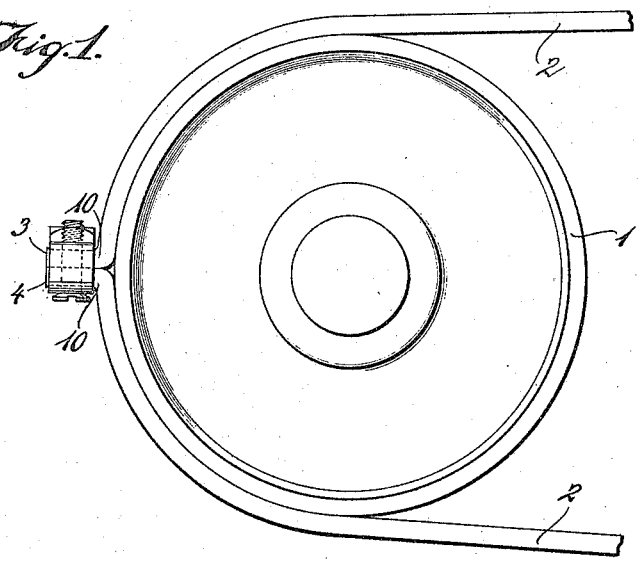
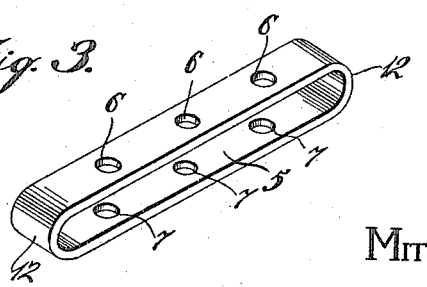
Witnesses
H. P. Harwood.
C. R. Ziegler.
Inventor
MITCHELL STONE.
By Joshua R. H. Potts
His Attorney

UNITED STATES PATENT OFFICE.

MITCHELL STONE, OF PHILADELPHIA, PENNSYLVANIA.

DRIVING-BELT.

1,220,795.	Specification of Letters Patent.	Patented Mar. 27, 1917.

Application filed August 21, 1916.   Serial No. 116,086.

*To all whom it may concern:*

Be it known that I, MITCHELL STONE, a citizen of the United States, residing at Philadelphia, in the county of Philadelphia and State of Pennsylvania, have invented certain new and useful Improvements in Driving-Belts, of which the following is a specification.

My invention consists of an improved coupling for driving belts, and is serviceable as a coupling for belts which attain high speeds.

One of the objects of my invention is to provide a coupling which will prevent the stretching of the edge portions to any greater extent than the middle or central portion of the belt.

Another object of my invention is to provide a coupling which will protect the edges adjacent the joint from wear during the operation and shifting of the belt.

A further object is to so construct my improved coupling and to so bind the ends that the operating surface of the belt will be comparatively smooth.

A still further object is to so make my improved coupling that when applied to a belt, the latter will be capable of engaging small pulleys and will not injure or tend to accidentally slide from the same.

Another object of my invention is to provide a coupling which will keep the edges of the belts upon which it is placed in substantial alinement.

These objects, and other advantageous ends which will be described hereinafter, I attain in the following manner, reference being had to the accompanying drawings in which Figure 1 is a side elevation showing the pulley having a belt thereon provided with my improved coupling.

Fig. 2 is an end view of Fig. 1 looking in the direction of the arrow.

Fig. 3 is a perspective view of a coupling band which I employ.

Referring to the drawings, 1 represents a pulley having a belt 2 thereon. The ends 3 and 4 of the belt are bent substantially at right angles to the outer face of the belt, and a coupling band 5 surrounds these end portions 3 and 4 as clearly shown in Figs. 1 and 2.

The band 5 is elongated and provided on its upper run with a series of holes 6. Each of these holes 6 is in line with a respective hole 7 in the lower run of the band 5. The end portions 3 and 4 are pierced to provide holes through which bolts 8 extend, said bolts also extending through the holes 6 and 7 in said band as shown in Fig. 2.

The bolts 8 are provided at one end with nuts 9, whereby the end portions 3 and 4 may be tightly bound between the inner surfaces of the band 5, the band being held tightly against the outer surfaces of the end portions 3 and 4.

The band 5 is preferably made seamless and of such length as to snugly house the edges 10 and 11 of the end portions 3 and 4, so that the ends 12 of the band form a protection for the edges 10 and 11.

The ends 12 also act as a clamp for the parts of the end portions 3 and 4 which lie between the extreme outer bolts 8 and the inner surface of said ends 12 of the band 5, so that it will be impossible for the belt to stretch to any greater extent at the edge portions 10 and 11 than at the middle of the width of said belt, thus the end portions of the band strengthens the belt at points not strengthened by the bolts.

The band 5 may be made of a light weight thin material, thus giving less vibration to the belt than devices which have been made prior to my invention, and since the band may be made narrow and light, it will go around large or small belts with equal advantage and thus gives uniform strength entirely around the joint.

While I have illustrated only three of the bolts 8, it will be noted that any number of bolts may be employed according to the width of the belt to which the coupling is attached.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A belt coupling, comprising an elongated flexible band designed to entirely surround the edges and outer faces of both end portions of the belt, and means for clamping said band to said end portions, said means being operative to transversely clamp the longitudinal runs of the band and thereby frictionally hold them in contact with the end portions of the belt, substantially as described.

2. A belt coupling comprising an elongated flexible band having holes in the longitudinal runs thereof, said band entirely surrounding the edges and outer faces of both end portions of said belt, and bolts extending through said holes in the band and through said end portions whereby said end portions are laterally clamped together by said longitudinal runs of the band, substantially as described.

3. A belt coupling comprising an elongated flexible continuous band having alined holes in its opposite longitudinal runs, said band being designed to fit over and entirely surround end portions of said belt, and bolts extending through said alined holes and through said end portions whereby the end portions are laterally bound together and within said band, substantially as described.

In testimony whereof I have signed my name to this specification in the presence of two subscribing witnesses.

MITCHELL STONE.

Witnesses:
C. R. ZIEGLER,
CHAS. E. POTTS.

Copies of this patent may be obtained for five cents each, by addressing the "Commissioner of Patents, Washington, D. C."